UNITED STATES PATENT OFFICE 2,363,694

HYDROGENATION OF FATTY ACID SOAPS

John Ross and Joseph Abrahm Valentine Turck, Jr., New York, N. Y., assignors to Colgate-Palmolive-Peet Company, Jersey City, N. J., a corporation of Delaware No Drawing. Application July 5, 1940, Serial No. 344,067

4 Claims. (Cl. 260—97.5)

The present invention is directed to the process of hydrogenating soap of unsaturated carboxylic acids, and more particularly it relates to the hydrogenation of aqueous solutions of unsaturated fatty acid soaps.

It has been stated in the literature and generally accepted that fatty acid soaps are catalyst poisons in the hydrogenation of unsaturated fatty acid materials. Soaps of fatty acids have a very high melting point and treatment thereof in the solid state would be inconvenient and inefficient. Furthermore, the presence of water in the hydrogenation of oils likewise from certain aspects has been considered disadvantageous. The water itself, or because of its partial vapor pressure, would be expected to inhibit or considerably impair the activity of the catalysts. The hydrogenation of fatty oils or fatty acids under anhydrous conditions developed in the last thirty years has been so successful that the weight of conventional practice has in time caused such practices to be considered the necessary conditions of operation. Obviously, such considerations have directed research away from the treatment of aqueous solutions of unsaturated fatty acid soaps.

In contradiction to these prior art practices and beliefs, it has now been found that it is possible readily to hydrogenate soaps of unsaturated carboxylic acids in solution. It has also been observed that it is possible to hydrogenate the unsaturated aliphatic acid soaps in the presence of water at relatively low temperatures without poisoning the catalyst. In addition, it has been found that low grade materials such as crude tall oil soaps may be hydrogenated directly to produce valuable, light-colored material for the soap and related industries.

The applicant's process, in general, comprises contacting a solution of unsaturated carboxylic acid soaps with hydrogen under pressure in the presence of a hydrogenation catalyst and at a temperature at which the desired constituents will hydrogenate. The temperature of treatment will depend among other things on the catalyst employed, the constituent which it is desired to hydrogenate, and the presence of other constituents. For example, a solution of polyolefinic acid sodium soap with a 14% nickel-kieselguhr catalyst will hydrogenate at a temperature of about 55° to 90° C. Solutions of mono-olefinic acid soaps, such as sodium oleate, will hydrogenate at a temperature of about 90° to 110° C. or higher. Complete hydrogenation of all commonly known unsaturated acids may usually be accomplished with this catalyst by treating aqueous solutions of their water-soluble soaps at temperatures up to about 200° C. or higher. These temperatures apply to the use of a nickel catalyst which may be prepared by precipitating nickelous carbonate or oxycarbonate or formate on kieselguhr, drying the impregnated earth at about 105° C., powdering the dried product, and finally reducing the mixture in a current of hydrogen at 400° C. for about two hours. The nickel content of the product should be about 9 to 15%, e. g. 14%. Other catalysts, such as Raney nickel, copper chromite, platinum, palladium and mixtures thereof, with or without protective addition agents such as gelatine, and catalyst adjuvants, such as sodium stannite and other inorganic and organic salts, may be used but the noble metals alone are generally expensive for large scale production, are less selective, and are usually more readily poisoned. With other hydrogenation catalysts the process may be similarly operated but other temperature conditions may be necessary.

The process may be conducted in a batch procedure by preparing a solution of unsaturated fatty acid soap. The solution is introduced into a pressure hydrogenation autoclave along with a small amount of a suitable hydrogenation catalyst. The autoclave is assembled and freed of oxygen at room temperature by evacuating, filling with hydrogen, and evacuating a second time. It is again filled with hydrogen, this time to a pressure of about 600 pounds per square inch at room temperature. The temperature is raised at a constant rate, while agitating the contents of the autoclave until absorption of hydrogen takes place. For increased hydrogenation rates, the temperature is further raised about 5° to 10° C. above the initial absorption temperature. By this means, selective hydrogenation of the unsaturated acids in a mixture can be obtained. By proper selection of the temperature, depending on the raw material employed, type and amount of catalyst and other factors, it is possible to obtain the desired degree of hydrogenation and the optimum proportion of desired products. The products are lighter in color, improved in odor, firmer, and are better adapted in many cases to make bars or cakes of soap.

The process may be operated in a continuous manner by preheating the solution containing the unsaturated acid soap. The solution at an elevated temperature and pressure is introduced into the top of a jacketed chamber, tower or tube packed with granular catalyst and/or catalyst screens. Hydrogen gas, under pressure and preferably warmed to the desired reaction temperature, is introduced into the bottom of the tower and flows upwardly countercurrent to the downwardly flowing unsaturated acid soap solution. The residual gas along with some vaporized constituents of the soap solution is withdrawn from the top of the tower. The hydrogen gas may be purified and recycled for further use. The solution of modified unsaturated acid soap is withdrawn at the bottom of the tower. The product is partially or fully hydrogenated, depending on the conditions of treatment, is lighter in color, free of disagreeable odors and impurities, and makes a substantially higher melting soap (or acid upon acidifying). Other methods of continuous hydrogenation may be employed.

Another method of hydrogenating the soaps is by electrolytic reduction of the aqueous solutions of the soaps. A catalyst may be suspended in the solution or a catalytic electrode may be employed for this purpose. It is usually desirable to maintain the pH of the solution relatively constant throughout the treatment. This process likewise may be performed in a batch or continuous procedure by means of one or a battery of electrolytic cells.

The following examples are given in order to illustrate the present invention but are not intended to be limiting on the scope thereof.

Example I

A 27% aqueous solution sodium oleate was treated with hydrogen gas at about 700 pounds per square inch and at about 110° C. in the presence of 1% of nickel in the form of a 14% nickel-kieselguhr catalyst. The hydrogen absorption began at 95° C. but the higher temperature was employed to speed the reaction. The hydrogenation is complete in about three hours. The amount of hydrogen absorbed corresponds to the theoretical amount for the formation of sodium stearate. The product is acidified and possesses all the properties of stearic acid of good color and odor. The iodine value of oleic acid (U. S. P.) used to prepare the soap was 90.8 whereas that of the acid split from the hydrogenated product was 1.2.

The process was repeated on a similar sample but the pressure employed was about 125 pounds per square inch with like results.

Example II

A 10% aqueous solution of crude tall oil soap was washed with an immiscible caustic soda-sodium chloride brine. It was then hydrogenated at about 128° C. and at a pressure of about 600 pounds per square inch in the presence of 2% nickel as a 14% reduced nickel-kieselguhr catalyst. The hydrogenation of the fatty acid soaps was complete without any substantial hydrogenation of the rosin soaps. The product is substantially lighter in color than the original material, has a more pleasant odor, and forms firm, light-colored cakes when salted from solution. This is a result usually not otherwise obtainable with tall oil soaps. The process is particularly advantageous in that the tall oil soap as obtained in the crude state need not be acidified at any point in the process of preparing valuable soap cakes thereof. The acids obtained on acidification are light-colored and have a pleasant odor. The iodine value of the acids split from the tall oil soap stock before hydrogenation was 122.5, and after hydrogenation was 102.

Example III

About 230 parts by weight of a 13% aqueous solution of a mixture of linoleic acid sodium soap, oleic acid sodium soap and stearic acid sodium soap (the acids of which have an iodine value of 138.7) were treated with hydrogen gas at a pressure of about 100 pounds per square inch in the presence of 1% nickel as a 14% reduced nickel-kieselguhr catalyst. The temperature was raised from room temperature to about 55° C., at which point hydrogen absorption began. The temperature was raised to about 65° C. to increase the rate of absorption. When no further hydrogen absorption took place, an examination of the product by splitting to the acids indicated that the linoleate was selectively reduced and that a maximum amount of light-colored oleic acid was obtained. The iodine value of the acid product was found to be 47.8. The process was repeated at a temperature of about 105° C. thereby producing substantially pure sodium stearate. The iodine value of the acid product of this more vigorous reduction was found to be 5.5.

Example IV 300 parts by weight of a 10% aqueous solution of the sodium soap of undecenoic acid were treated with hydrogen gas at about 100 pounds per square inch pressure in the presence of 1% nickel as a 14% reduced nickel-kieselguhr catalyst. The temperature was raised to about 44° C., at which point hydrogen absorption began. The temperature was raised an additional 30° C. to increase the rate of hydrogenation. When substantially no more hydrogen was absorbed, the bomb was cooled and the product examined. The undecenoic acid used to prepare the soap for treating had an iodine value of 132.3, whereas the acid split from the soap product was found to be substantially pure undecanoic acid having an iodine value of substantially zero.

The process is particularly adapted to partial hydrogenation of soaps of fish oils or other polyolefinic acids in order to obtain the maximum content of mono-olefinic acid soaps, which give excellent solubility coupled with good working properties and detergency.

The soap solutions may be treated in the absence of added constituents or they may be hydrogenated in the presence of free fatty acids, fatty oils, waxes, glycerine or even in the presence of free alkali. The presence of alkali, such as sodium hydroxide, sodium carbonate, sodium phosphate, borax, sodium silicate or the like, seems to be conducive to rapid hydrogenation.

Although it is possible to hydrogenate the soap solutions directly without removal of any of the by-products as impurities, it is sometimes advantageous to treat the soaps either before or after the hydrogenation to purify and/or to fractionate them.

Before the hydrogenation, it is particularly desirable to treat the soaps, preferably under non-oxidizing conditions, with a substantially immiscible hot aqueous caustic alkaline solution or brine so as to separate glycerine, phenols, mercaptans, lignin-like and other soluble substances from the soaps. It is also desirable to blow the hot soap mixture with steam, air, flue gases, and/or other non-reactive gas to volatilize the unsaponifiable, lower boiling, odoriferous materials before, during or after the alkaline brine extraction. The blowing advantageously may accompany the brine treatment in order to obtain thorough agitation and washing of the soaps with the caustic brine solution. Steam agitation likewise heats the soap, reduces its viscosity and increases the solubility of the impurities in the extracting solution. The presence of the inorganic salts and/or base during the blowing operation also serves to open the soap. Without these inorganic materials being present the soap is tough and plastic, thus preventing substantial removal of the volatile impurities. After settling, the soaps of the carboxylic acid may then be separated from the brine by drawing off the brine, by decanting, or by centrifuging, thinned with water again, and washed with a fresh caustic alkaline brine of sodium sulphate, sodium chloride and/or the like. The treatment is made preferably before the hydrogenation of the soaps but may be conducted on the soaps after hydrogenation. If acidified the organic acid product is clear, lighter in color, and substantially free from precipitated lignin materials. Many of the colored and potentially colored materials are removed, thus effecting an economy of hydrogen and catalyst in the subsequent hydrogenation treatment.

The unsaponifiable constituents may be removed before and/or after hydrogenation by any suitable method, such as solvent extraction, or high temperature steam distillation of the anhydrous molten soaps in an inert atmosphere.

It is also possible to dissolve the inorganic acids, before or after the hydrogenation of the soaps thereof, in gasoline and to treat this solution with furfural, clay, carbon, silica gel, amphoteric metal halides such as stannic chloride, and/or with similar materials to remove additional viscous, resinous and/or color bodies. The acids may be lightened in color by distillation, including fractionation, at any point during the treatment, in order to improve the final products.

Various unsaturated organic acid salts, whether or not straight chain, branched chain, substituted and/or cyclic, may be treated by the present process. Included are the salts of tall oil, olive oil, palm oil, coconut oil, wool fat, cottonseed oil, cottonseed foots, whale oil, shark oil, menhaden oil, sardine oil and other fish oils, garbage grease, sperm oil, tallow, animal grease, rosin, naphthenic acids, oxidized petroleum acids, peanut oil, linseed oil, soy bean oil, Chinawood oil, oiticia oil, castor oil, the various individual acids in said materials including oleic acid, ricinoleic acid, palmitoleic acid, undecenoic acid, linoleic acid, linolenic acid, eleostearic acid, unsaturated homocyclic acids and heterocyclic acids including aromatic acids, substituted aromatic acids, cycloaliphatic acids, substituted cycloaliphatic acids, oxygen, nitrogen and sulphur heterocyclic acids and substituted derivatives thereof such as cinnamic acid, thenoic acid, furoic acid, kojic acid, ascorbic acid, and unsaturated aliphatic, cycloaliphatic and/or aromatic sulphonic acids and acid sulphates, as well as mixtures of these fats, oils, acids, resins and the like.

The method is particularly applicable to the treatment of compounds stable in the alkaline condition, many of which are unstable or highly reactive in the acid state. Such compounds include the hydroxy unsaturated acids, such as ricinoleic acid, which tends to form complexes at increased temperatures in an acid condition. It is also a feature of the invention that it is possible to employ directly catalysts, such as Raney nickel, which are formed in an aqueous and/or alkaline condition, without the tedious, expensive and onerous extracting and drying of these catalysts as is required for these prior art procedures for treating the acids or their esters. In addition, the reduction can be conducted in the presence of other organic and inorganic materials such as sodium sulphate, sodium chloride, sodium carbonate and the like.

The soaps may be made by any process either in a batch or in a continuous procedure. The alkaline materials which may be used include caustic soda, caustic potash, lime, soda ash, potash, magnesia, ammonia and other monovalent and polyvalent metal or cation bases. It is possible to employ organic solvent solutions thereof, particularly when operating with polyvalent metal soaps. Suitable solvents include aromatic, aliphatic, alklated aromatic, and cycloaliphatic hydrocarbons and alcohols such as benzine, benzene, toluene, naphtha, isopropanol, butanol, ethanol, methanol, polyhydric alcohols and their mixtures. Water or water-alcohol solutions of the monovalent cation soaps are, however, preferred.

As many widely different embodiments of the invention may be made without departing from the spirit and scope thereof, it is to be understood that the application is not limited to the specific proportions or embodiments thereof except as defined in the following claims.

We claim:

1. The process of partial hydrogenation of water-soluble salts of polyolefinic fatty acids which comprises treating a solution of salt of polyolefinic fatty acids in water with hydrogen in the presence of a nickel hydrogenation catalyst at a temperature above 40° C. but not above 90° C. and at a pressure above 50 pounds per square inch.

2. The process of hydrogenating water-soluble soaps of unsaturated higher fatty acids which comprises treating a soap of higher unsaturated fatty acids while dissolved in water with hydrogen in the presence of a nockel hydrogenation catalyst at a temperature between 40° C. and 200° C. and at a pressure above 50 pounds per square inch.

3. The process of hydrogenating water-soluble soaps of unsaturated tall oil fatty acids which comprises treating a solution of tall oil soap in water with hydrogen in the presence of a hydrogenation catalyst.

4. The process of hydrogenating sodium soaps of unsaturated tall oil fatty acids which comprises reacting a solution of tall oil sodium soap in water with hydrogen in the presence of a nickel hydrogenation catalyst at a temperature between 40° C. and 130° C. at a pressure above 50 pounds per square inch.

JOHN ROSS.
JOSEPH ABRAHM
VALENTINE TURCK, JR.